United States Patent
Madala et al.

(10) Patent No.: US 12,309,028 B2
(45) Date of Patent: May 20, 2025

(54) AUTOMATIC DETERMINATION OF CODE CUSTOMIZATIONS

(71) Applicant: ServiceNow, Inc., Santa Clara, CA (US)

(72) Inventors: Vamsi Krishna Madala, San Diego, CA (US); Brian James Waplington, San Diego, CA (US); Santosh Poreddy, Santa Clara, CA (US)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 17/574,203

(22) Filed: Jan. 12, 2022

(65) Prior Publication Data

US 2022/0141098 A1   May 5, 2022

Related U.S. Application Data

(63) Continuation of application No. 17/244,150, filed on Apr. 29, 2021, now Pat. No. 11,252,047, which is a continuation of application No. 16/843,573, filed on Apr. 8, 2020, now Pat. No. 11,025,508.

(51) Int. Cl.
| | |
|---|---|
| *H04L 41/0859* | (2022.01) |
| *H04L 41/12* | (2022.01) |
| *H04L 41/16* | (2022.01) |
| *H04L 41/22* | (2022.01) |

(52) U.S. Cl.
CPC .......... *H04L 41/0859* (2013.01); *H04L 41/12* (2013.01); *H04L 41/16* (2013.01); *H04L 41/22* (2013.01)

(58) Field of Classification Search
CPC ......... H04L 41/22; H04L 41/16; H04L 41/12; H04L 41/0866; H04L 41/0859; G06F 8/75
See application file for complete search history.

(56) References Cited

U.S. PATENT DOCUMENTS

| | | | |
|---|---|---|---|
| 4,941,084 A | 7/1990 | Terada et al. | |
| 5,185,860 A | 2/1993 | Wu | |
| 5,237,518 A | 8/1993 | Sztipanovits et al. | |
| 5,261,097 A | 11/1993 | Saxon | |
| 5,265,252 A | 11/1993 | Rawson, III et al. | |
| 5,367,685 A | 11/1994 | Gosling | |
| 5,390,297 A | 2/1995 | Barber et al. | |
| 5,442,791 A | 8/1995 | Wrabetz et al. | |
| 5,452,415 A | 9/1995 | Hotka | |
| 5,522,042 A | 5/1996 | Fee et al. | |
| 5,533,116 A | 7/1996 | Vesterinen | |
| 5,655,081 A | 8/1997 | Bonnell et al. | |
| 5,659,736 A | 8/1997 | Hasegawa et al. | |
| 5,671,412 A * | 9/1997 | Christiano | G06Q 30/04 |
| 5,696,701 A | 12/1997 | Burgess et al. | |
| 5,715,463 A | 2/1998 | Merkin | |
| 5,745,879 A | 4/1998 | Wyman | |
| 5,761,502 A | 6/1998 | Jacobs | |
| 5,764,913 A | 6/1998 | Jancke et al. | |
| 5,887,139 A | 3/1999 | Madison, Jr. et al. | |
| 5,909,217 A | 6/1999 | Bereiter | |
| 5,937,165 A | 8/1999 | Schwaller et al. | |
| 5,949,976 A | 9/1999 | Chappelle | |
| 5,978,594 A | 11/1999 | Bonnell et al. | |
| 6,021,437 A | 2/2000 | Chen et al. | |
| 6,041,347 A | 3/2000 | Harsham et al. | |
| 6,088,717 A | 7/2000 | Reed et al. | |
| 6,101,500 A | 8/2000 | Lau | |
| 6,128,016 A | 10/2000 | Coelho et al. | |
| 6,131,118 A | 10/2000 | Stupek, Jr. et al. | |
| 6,134,581 A | 10/2000 | Ismael et al. | |
| 6,138,122 A | 10/2000 | Smith et al. | |
| 6,148,335 A | 11/2000 | Haggard et al. | |
| 6,166,732 A | 12/2000 | Mitchell et al. | |

(Continued)

FOREIGN PATENT DOCUMENTS

| | | |
|---|---|---|
| EP | 0433979 | 6/1991 |
| EP | 1607824 | 12/2005 |

(Continued)

OTHER PUBLICATIONS

Notice of Allowance dated Jan. 18, 2022 for U.S. Appl. No. 16/991,704, 9 pages.

*Primary Examiner* — Brian Whipple
(74) *Attorney, Agent, or Firm* — MCDONNELL BOEHNEN HULBERT & BERGHOFF LLP

(57) ABSTRACT

A system could include a first set of mappings between application files and version indicators. The application files could be related to a software application. The system could also include a second set of mappings between application files and a first subset of version indicators, where a standardized release of the software application includes application file versions in accordance with the first subset. The system could further include a third set of mappings between a second subset of version indicators and records indicating that the corresponding application file versions were written after the standardized release. The system could further include processors configured to perform operations including: determining that an application file in the third set of mappings has standardized release version. The operations could further include providing a difference between a recent version of the application file and the application file version that was part of the standardized release.

18 Claims, 14 Drawing Sheets

(56) References Cited

U.S. PATENT DOCUMENTS

| | | | |
|---|---|---|---|
| 6,167,448 A | 12/2000 | Hemphill et al. |
| 6,175,866 B1 | 1/2001 | Holloway et al. |
| 6,175,878 B1 | 1/2001 | Seaman et al. |
| 6,260,050 B1 | 7/2001 | Yost et al. |
| 6,263,457 B1 | 7/2001 | Anderson et al. |
| 6,272,150 B1 | 8/2001 | Hrastar et al. |
| 6,336,138 B1 | 1/2002 | Caswell et al. |
| 6,363,421 B2 | 3/2002 | Barker et al. |
| 6,393,386 B1 | 5/2002 | Zager et al. |
| 6,397,245 B1 | 5/2002 | Johnson, II et al. |
| 6,434,626 B1 | 8/2002 | Prakash et al. |
| 6,438,592 B1 | 8/2002 | Killian |
| 6,456,306 B1 | 9/2002 | Chin et al. |
| 6,466,932 B1 | 10/2002 | Dennis et al. |
| 6,487,590 B1 | 11/2002 | Foley et al. |
| 6,505,248 B1 | 1/2003 | Casper et al. |
| 6,526,442 B1 | 2/2003 | Stupek, Jr. et al. |
| 6,621,823 B1 | 9/2003 | Mellquist et al. |
| 6,707,795 B1 | 3/2004 | Noorhosseini et al. |
| 6,742,015 B1 | 5/2004 | Bowman-Amuah |
| 6,763,380 B1 | 7/2004 | Mayton et al. |
| 6,816,898 B1 | 11/2004 | Scarpelli et al. |
| 6,895,586 B1 | 5/2005 | Brasher et al. |
| 6,948,175 B1 | 9/2005 | Fong et al. |
| 6,985,901 B1 | 1/2006 | Sachse et al. |
| 7,003,564 B2 | 2/2006 | Greuel et al. |
| 7,028,228 B1 | 4/2006 | Lovy et al. |
| 7,043,537 B1 | 5/2006 | Pratt |
| 7,043,661 B2 | 5/2006 | Valadarsky et al. |
| 7,062,683 B2 | 6/2006 | Warpenburg et al. |
| 7,096,459 B2 | 8/2006 | Keller et al. |
| 7,146,574 B2 | 12/2006 | Goldthwaite et al. |
| 7,197,466 B1 | 3/2007 | Peterson et al. |
| 7,215,360 B2 | 5/2007 | Gupta |
| 7,216,304 B1 | 5/2007 | Gourdol et al. |
| 7,222,147 B1 | 5/2007 | Black et al. |
| 7,281,170 B2 | 10/2007 | Taylor et al. |
| 7,412,502 B2 | 8/2008 | Fearn et al. |
| 7,505,872 B2 | 3/2009 | Keller et al. |
| 7,593,013 B2 | 9/2009 | Agutter et al. |
| 7,596,716 B2 | 9/2009 | Frost et al. |
| 7,617,073 B2 | 11/2009 | Trinon et al. |
| 7,660,731 B2 | 2/2010 | Chaddha et al. |
| 7,676,294 B2 | 3/2010 | Baier et al. |
| 7,676,437 B2 | 3/2010 | Satkunanathan et al. |
| 7,693,845 B2 | 4/2010 | Scanzano |
| 7,840,490 B1 | 11/2010 | Sellers et al. |
| 7,877,783 B1 | 1/2011 | Cline et al. |
| 7,890,869 B1 | 2/2011 | Mayer et al. |
| 7,966,398 B2 | 6/2011 | Wiles, Jr. |
| 7,979,450 B2 | 7/2011 | Adler |
| 8,060,396 B1 | 11/2011 | Bessler et al. |
| 8,108,431 B1 | 1/2012 | Guner |
| 8,196,210 B2 | 6/2012 | Sterin |
| 8,321,948 B2 * | 11/2012 | Robinson ................ G06F 21/10 726/28 |
| 8,407,669 B2 | 3/2013 | Yee et al. |
| 8,554,750 B2 | 10/2013 | Rangarajan et al. |
| 8,595,647 B2 | 11/2013 | Sabin et al. |
| 8,620,818 B2 | 12/2013 | Hughes et al. |
| 8,646,093 B2 | 2/2014 | Myers et al. |
| 8,674,992 B2 | 3/2014 | Poston et al. |
| 8,725,647 B2 | 5/2014 | Disciascio et al. |
| 9,053,460 B2 | 6/2015 | Gilbert et al. |
| 10,489,388 B1 | 11/2019 | Rogynskyy |
| 10,673,963 B1 | 6/2020 | Feiguine et al. |
| 10,749,943 B1 | 8/2020 | Feiguine et al. |
| 10,771,344 B2 | 9/2020 | Bitterfeld et al. |
| 10,824,650 B2 | 11/2020 | Bar Oz et al. |
| 10,944,654 B2 | 3/2021 | Rimar et al. |
| 11,032,381 B2 | 6/2021 | Feiguine |
| 11,089,115 B2 | 8/2021 | Garty et al. |
| 11,095,506 B1 | 8/2021 | Erblat et al. |
| 11,115,471 B2 | 9/2021 | Sant |
| 2002/0116340 A1 | 8/2002 | Hellberg et al. |
| 2002/0133584 A1 | 9/2002 | Greuel et al. |
| 2002/0158969 A1 | 10/2002 | Gupta |
| 2003/0051230 A1 | 3/2003 | Molchanov |
| 2003/0118087 A1 | 6/2003 | Goldthwaite et al. |
| 2003/0200293 A1 | 10/2003 | Fearn et al. |
| 2005/0015217 A1 | 1/2005 | Weidl et al. |
| 2005/0091356 A1 | 4/2005 | Izzo |
| 2006/0026453 A1 | 2/2006 | Frost et al. |
| 2006/0095461 A1 | 5/2006 | Raymond |
| 2006/0179058 A1 | 8/2006 | Bram et al. |
| 2006/0293942 A1 | 12/2006 | Chaddha et al. |
| 2007/0033279 A1 | 2/2007 | Battat et al. |
| 2007/0188494 A1 | 8/2007 | Agutter et al. |
| 2007/0288389 A1 | 12/2007 | Vaughan et al. |
| 2008/0133289 A1 | 6/2008 | Armour et al. |
| 2008/0148253 A1 | 6/2008 | Badwe et al. |
| 2008/0319779 A1 | 12/2008 | Hughes et al. |
| 2009/0088375 A1 | 4/2009 | Baier et al. |
| 2009/0228984 A1 | 9/2009 | Sterin |
| 2010/0110932 A1 | 5/2010 | Doran et al. |
| 2012/0144378 A1 * | 6/2012 | Shah ........................ G06F 8/60 717/170 |
| 2013/0268673 A1 * | 10/2013 | Graham-Cumming .................... H04L 67/2876 709/226 |
| 2014/0297774 A1 * | 10/2014 | Munupalle ......... H04L 41/0889 709/208 |
| 2018/0025059 A1 | 1/2018 | Batchu |
| 2018/0046670 A1 | 2/2018 | Atkins |
| 2018/0091624 A1 * | 3/2018 | Forbes .................... H04L 45/74 |
| 2018/0123940 A1 | 5/2018 | Rimar et al. |
| 2019/0104398 A1 | 4/2019 | Owen et al. |
| 2020/0050689 A1 | 2/2020 | Tal et al. |
| 2020/0073782 A1 * | 3/2020 | Phoenix .............. G06F 11/3604 |
| 2020/0204443 A1 | 6/2020 | Bar Oz et al. |
| 2021/0194764 A1 | 6/2021 | Badyan et al. |
| 2021/0203731 A1 | 7/2021 | Garty |
| 2021/0224258 A1 | 7/2021 | Faruquie |
| 2021/0349875 A1 | 11/2021 | Gui |

FOREIGN PATENT DOCUMENTS

| | | |
|---|---|---|
| WO | WO 99/34285 | 7/1999 |
| WO | WO 00/52559 | 9/2000 |
| WO | WO 01/79970 | 10/2001 |

* cited by examiner

| | ⚲ | ≡ Created | ≡ Last Modified | ≡ Updated By | ≡ Class | ≡ Display Name △ |
|---|---|---|---|---|---|---|
| ☐ | ⊖ | 2019-11-15 | 2019-11-15 | admin | Access Control | Access.js |
| ☐ | ⊖ | 2019-11-15 | 2019-11-15 | admin | Field Labels | Numbers.txt |
| ☐ | ⊖ | 2019-11-15 | 2020-1-20 | User 123 | Dictionary Entry | Profiles.sql |
| ☐ | ⊖ | 2019-11-15 | 2019-11-15 | admin | Dictionary Entry | Address.sql |
| ☐ | ⊖ | 2019-11-15 | 2019-12-30 | User 222 | Dictionary Entry | Passwords.sql |
| ☐ | ⊖ | 2020-1-20 | 2020-1-20 | User 123 | Access Control | Security.js |

FIG. 10A

1200 — DETERMINE, BASED ON A SECOND SET OF MAPPINGS, THAT AN APPLICATION FILE REFERENCED BY A THIRD SET OF MAPPINGS HAS A VERSION THAT WAS IN A STANDARDIZED RELEASE OF A SOFTWARE APPLICATION, WHEREIN THE SOFTWARE APPLICATION IS EXECUTABLE BY A COMPUTATIONAL INSTANCE, WHEREIN THE COMPUTATIONAL INSTANCE INCLUDES PERSISTENT STORAGE, THE PERSISTENT STORAGE CONTAINING: (I) A FIRST SET OF MAPPINGS BETWEEN IDENTIFIERS OF APPLICATION FILES RELATED TO THE SOFTWARE APPLICATION AND VERSION INDICATORS OF THE APPLICATION FILES, (II) THE SECOND SET OF MAPPINGS, WHEREIN THE SECOND SET OF MAPPINGS INCLUDE MAPPINGS BETWEEN THE IDENTIFIERS OF THE APPLICATION FILES AND A FIRST SUBSET OF THE VERSION INDICATORS, WHEREIN THE STANDARDIZED RELEASE OF THE SOFTWARE APPLICATION INCLUDES VERSIONS OF THE APPLICATION FILES IN ACCORDANCE WITH THE FIRST SUBSET OF THE VERSION INDICATORS, AND (III) THE THIRD SET OF MAPPINGS, AND WHEREIN THE THIRD SET OF MAPPINGS INCLUDE MAPPINGS BETWEEN A SECOND SUBSET OF THE VERSION INDICATORS AND RECORDS INDICATING THAT THE CORRESPONDING APPLICATION FILE VERSIONS HAVE BEEN WRITTEN TO THE PERSISTENT STORAGE AFTER THE STANDARDIZED RELEASE OF THE SOFTWARE APPLICATION WAS INSTALLED ON THE COMPUTATIONAL INSTANCE

1210 — RESPONSIVE TO DETERMINING THAT THE APPLICATION FILE DOES INCLUDE THE VERSION THAT WAS IN THE STANDARDIZED RELEASE OF THE SOFTWARE APPLICATION, PROVIDE, BASED ON THE FIRST SET OF MAPPINGS, A DIFFERENCE BETWEEN A MOST RECENT VERSION OF THE APPLICATION FILE AND THE VERSION OF THE APPLICATION FILE THAT WAS PART OF THE STANDARDIZED RELEASE

FIG. 12

AUTOMATIC DETERMINATION OF CODE CUSTOMIZATIONS

CROSS-REFERENCE TO RELATED APPLICATIONS

This application is a continuation of and claims priority to U.S. patent application Ser. No. 17/244,150, filed Apr. 29, 2021, which is hereby incorporated by reference in its entirety.

U.S. patent application Ser. No. 17/244,150 is a continuation of and claims priority to U.S. patent application Ser. No. 16/843,573, filed Apr. 8, 2020, which is hereby incorporated by reference in its entirety.

BACKGROUND

A remote network management platform could provide various software applications to enterprise customers. Such software applications could include, for example, device and software discovery applications, service mapping applications, information technology (IT) operations and service management applications, and machine learning applications, among other possibilities. In some cases, users of the remote network management platform may modify and/or customize these applications. Occasionally, an application provided by the remote network management platform has a defect that causes the application to produce an incorrect or unexpected result, or to behave in unintended way. Such defects could negatively affect users of the software application. But determining the root cause of the defect can be challenging, especially when users have modified the application.

SUMMARY

Locating a software defect in a software application generally necessitates an intimate knowledge of the software application's source code. For example, upon receiving a support ticket from a user describing unexpected behavior in a software application, an agent assigned to resolve the issue raised by the ticket may locate and examine portions of the application's source code that encompass the unexpected behavior. If the assigned agent is not otherwise familiar with the aspects, features and functions in the source code, this troubleshooting process can become unduly complex and time consuming.

To further complicate matters, some software applications allow users to incorporate custom functionality. This often involves a user modifying and/or updating a software application's source code to include new features, functions, and other aspects. In such situations, troubleshooting software defects not only involves parsing through the "out of the box" source code, but further involves parsing through the new source code added by a user.

During empirical investigations, it has been observed that the majority (e.g., perhaps 80% to 90% or more) of support tickets involved software defects that were located in user-modified source code rather than "out of the box" source code. Accordingly, a troubleshooting process could involve first examining user-modified portions of the software application's source code. However, if the source code is large and contains many custom changes, the process of locating these user-modified portions within the source code may be unduly complicated.

Disclosed herein is an approach to address this technical problem. In accordance with the disclosure, a remote network management platform may include a troubleshooting tool that can pinpoint user customizations in a software application's source code. In practice, the troubleshooting tool could have access to data that indicates particular application files in the software application's source code that have been written by a user. The term written, as used herein, refers to application files that were modified and/or created by a particular entity, such as a user or another entity. The troubleshooting tool could also have access to data that indicates particular application files in the software application's source code that were part of a "standardized release" of the software application.

The disclosed troubleshooting tool could use such data to identify relevant portions of the application files. In the case of an application file modified by a user, the relevant portions may by identified by performing a textual difference between a most recent version of the application file and a standardized release version of the application file. The textual difference may find and then provide a representations of edits (e.g., additions, modifications, deletions) made to the standardized release version of the application file that result in the most recent version of the file. On the other hand, in the case of an application file created by user, the relevant portions of the application file may be the most recent version of the application file, as a standardized release version of the application file may not exist.

With the relevant portions determined, the troubleshooting tool could display these relevant portions on a graphical user interface (GUI). For instance, the troubleshooting tool could display a list of application files that have been customized by a user. The list could include information on the creation date of those application files, the last modification date of those application files, the user who last updated those application files, and so on. Upon a receiving a selection of an application file from the list, the troubleshooting tool could responsively display the application file in its original state and in a customized state, with differences between the two states highlighted to help pinpoint changes that have been made to the application file. The differences can be viewed as a side by side or in a merged view. Given that a software application's source code could contain hundreds, if not thousands of user-modified portions, the troubleshooting tool advantageously reduces the time it takes to identify user customizations in the source code. Other advantages may also exist Accordingly, a first example embodiment may involve a computing system. The computing system may include persistent storage disposed within a computational instance of a remote network management platform. The persistent storage may contain a first set of mappings between identifiers of application files and version indicators of the application files, where the application files are related to a software application that is executable by the computational instance. The persistent storage may further contain a second set of mappings between the identifiers of the application files and a first subset of the version indicators, where a standardized release of the software application that was installed on the computational instance includes versions of the application files in accordance with the first subset of the version indicators. The persistent storage may yet further contain a third set of mappings between a second subset of the version indicators and records indicating that the corresponding application file versions have been written to the persistent storage after the standardized release of the software application was installed on the computational instance. The computing system may also include one or more processors disposed within the computational instance and configured to perform operations. These operations may involve determining, based on the second of mappings, that an application file of the application files referenced by the third set of mappings has a version that was in the standardized release of the software application. The operations may also involve, responsive to determining that the application file does include a version that was in the standardized release of the software application, providing, based on the first set of mappings, a difference between a most recent version of the application file and the version of the application file that was part of the standardized release.

In a second example embodiment, an article of manufacture may include a non-transitory computer-readable medium, having stored thereon program instructions that, upon execution by a computing system, cause the computing system to perform operations in accordance with the first example embodiment.

In a third example embodiment, a computing system may include at least one processor, as well as memory and program instructions. The program instructions may be stored in the memory, and upon execution by the at least one processor, cause the computing system to perform operations in accordance with the first example embodiment.

In a fourth example embodiment, a system may include various means for carrying out each of the operations of the first example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIGS. 10A and 10B depict web pages, in accordance with example embodiments.

FIG. 12 is a flow chart, in accordance with example embodiments.

DETAILED DESCRIPTION

Figure 1:
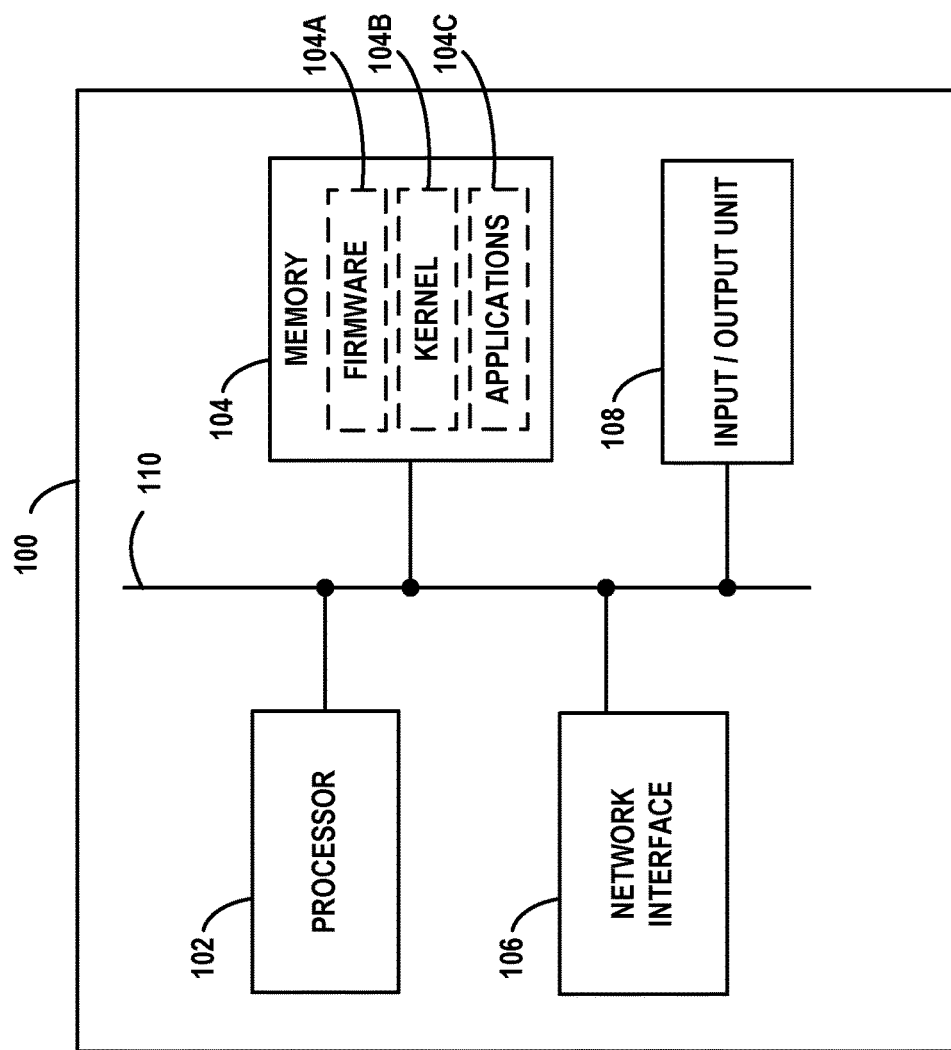
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. INTRODUCTION

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline, and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflows for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

Such an aPaaS system may represent a GUI in various ways. For example, a server device of the aPaaS system may generate a representation of a GUI using a combination of HTML, and JAVASCRIPT®. The JAVASCRIPT® may include client-side executable code, server-side executable code, or both. The server device may transmit or otherwise provide this representation to a client device for the client device to display on a screen according to its locally-defined look and feel. Alternatively, a representation of a GUI may take other forms, such as an intermediate form (e.g., JAVA® byte-code) that a client device can use to directly generate graphical output therefrom. Other possibilities exist.

Further, user interaction with GUI elements, such as buttons, menus, tabs, sliders, checkboxes, toggles, etc. may be referred to as "selection", "activation", or "actuation" thereof. These terms may be used regardless of whether the GUI elements are interacted with by way of keyboard, pointing device, touchscreen, or another mechanism.

An aPaaS architecture is particularly powerful when integrated with an enterprise's network and used to manage such a network. The following embodiments describe architectural and functional aspects of example aPaaS systems, as well as the features and advantages thereof.

II. EXAMPLE COMPUTING DEVICES AND CLOUD-BASED COMPUTING ENVIRONMENTS

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and input/output unit 108, all of which may be coupled by system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and buses) of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
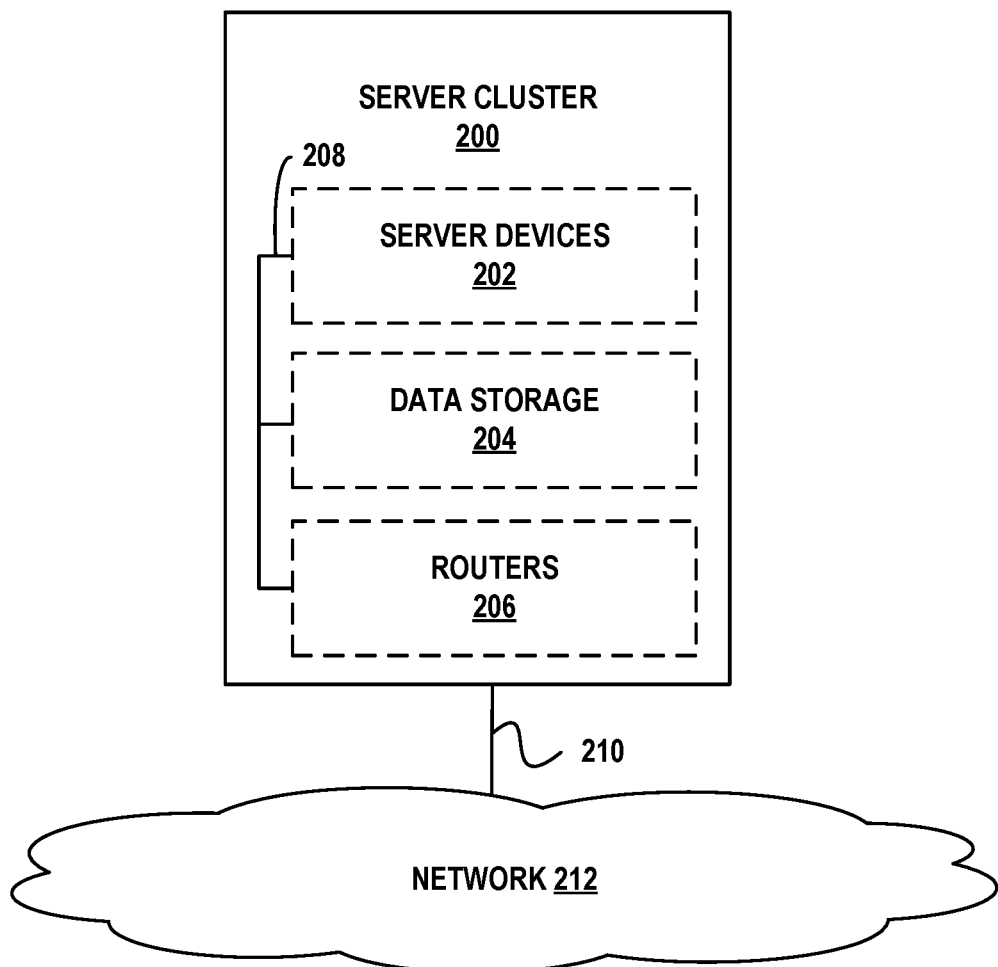
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purposes of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency, and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page or web application representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages. Alternatively or additionally, JAVA® may be used to facilitate generation of web pages and/or to provide web application functionality.

III. EXAMPLE REMOTE NETWORK MANAGEMENT ARCHITECTURE

Figure 3:
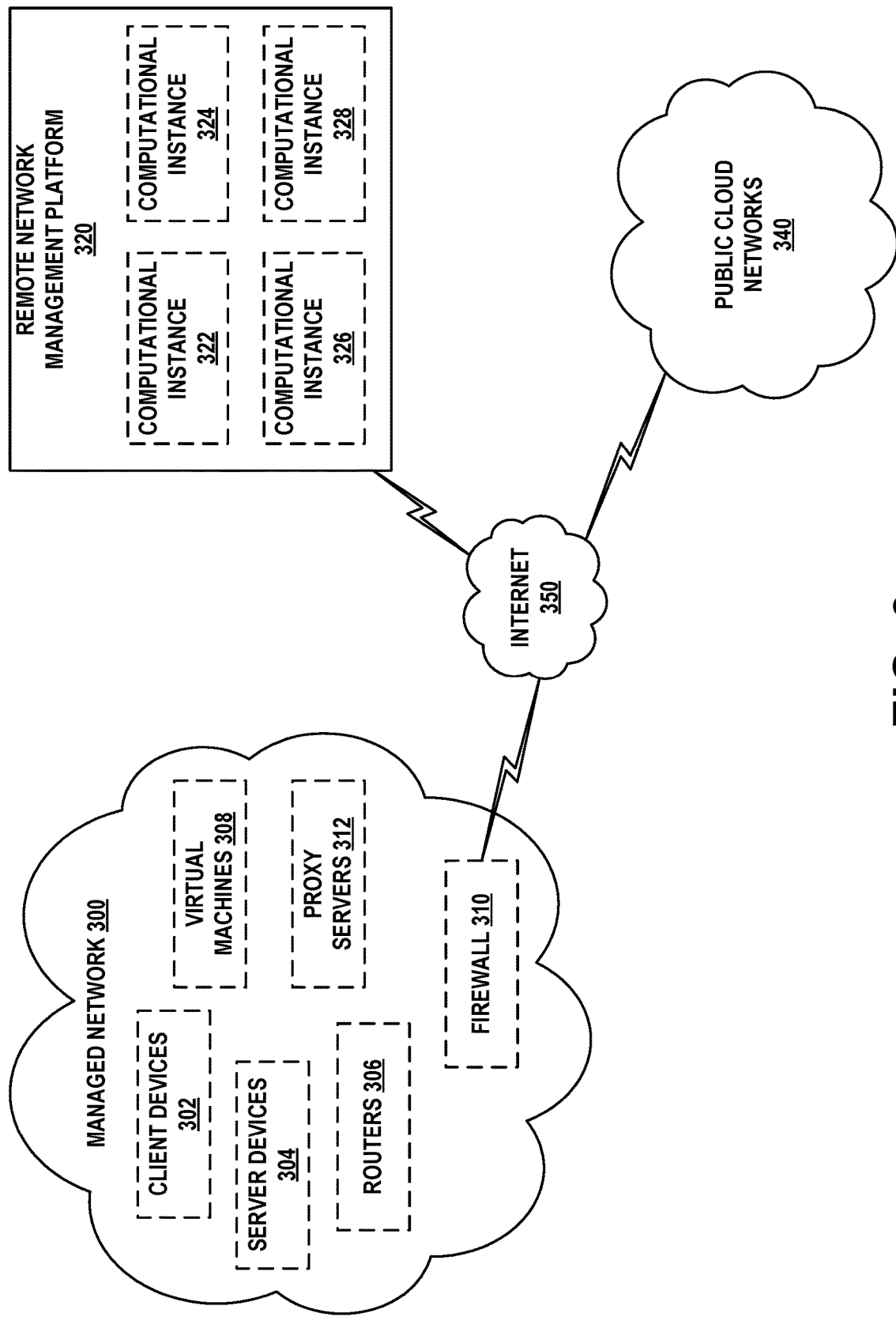
FIG. 3 depicts a remote network management architecture, in accordance with example embodiments.

FIG. 3 depicts a remote network management architecture, in accordance with example embodiments. This architecture includes three main components—managed network 300, remote network management platform 320, and public cloud networks 340—all connected by way of Internet 350.

A. Managed Networks

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server application that facilitates communication and movement of data between managed network 300, remote network management platform 320, and public cloud networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of public cloud networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

B. Remote Network Management Platforms

Remote network management platform 320 is a hosted environment that provides aPaaS services to users, particularly to the operator of managed network 300. These services may take the form of web-based portals, for example, using the aforementioned web-based technologies. Thus, a user can securely access remote network management platform 320 from, for example, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these computational instances may represent one or more server nodes operating dedicated copies of the aPaaS software and/or one or more database nodes. The arrangement of server and database nodes on physical server devices and/or virtual machines can be flexible and may vary based on enterprise needs. In combination, these nodes may provide a set of web portals, services, and applications (e.g., a wholly-functioning aPaaS system) available to a particular enterprise. In some cases, a single enterprise may use multiple computational instances.

For example, managed network 300 may be an enterprise customer of remote network management platform 320, and may use computational instances 322, 324, and 326. The reason for providing multiple computational instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows within one or more database tables).

For purposes of clarity, the disclosure herein refers to the arrangement of application nodes, database nodes, aPaaS software executing thereon, and underlying hardware as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of application and database nodes disposed upon some number of physical server devices or virtual machines. Such a central instance may serve as a repository for specific configurations of computational instances as well as data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate virtual machines that dedicate varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, a computational instance such as computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

C. Public Cloud Networks

Public cloud networks 340 may be remote server devices (e.g., a plurality of server clusters such as server cluster 200) that can be used for outsourced computation, data storage, communication, and service hosting operations. These servers may be virtualized (i.e., the servers may be virtual machines). Examples of public cloud networks 340 may include AMAZON WEB SERVICES® and MICROSOFT® AZURE®. Like remote network management platform 320, multiple server clusters supporting public cloud networks 340 may be deployed at geographically diverse locations for purposes of load balancing, redundancy, and/or high availability.

Managed network 300 may use one or more of public cloud networks 340 to deploy applications and services to its clients and customers. For instance, if managed network 300 provides online music streaming services, public cloud networks 340 may store the music files and provide web interface and streaming capabilities. In this way, the enterprise of managed network 300 does not have to build and maintain its own servers for these operations.

Remote network management platform 320 may include modules that integrate with public cloud networks 340 to expose virtual machines and managed services therein to managed network 300. The modules may allow users to request virtual resources, discover allocated resources, and provide flexible reporting for public cloud networks 340. In order to establish this functionality, a user from managed network 300 might first establish an account with public cloud networks 340, and request a set of associated resources. Then, the user may enter the account information into the appropriate modules of remote network management platform 320. These modules may then automatically discover the manageable resources in the account, and also provide reports related to usage, performance, and billing.

D. Communication Support and Other Operations

Internet 350 may represent a portion of the global Internet. However, Internet 350 may alternatively represent a different type of network, such as a private wide-area or local-area packet-switched network.

Figure 4:
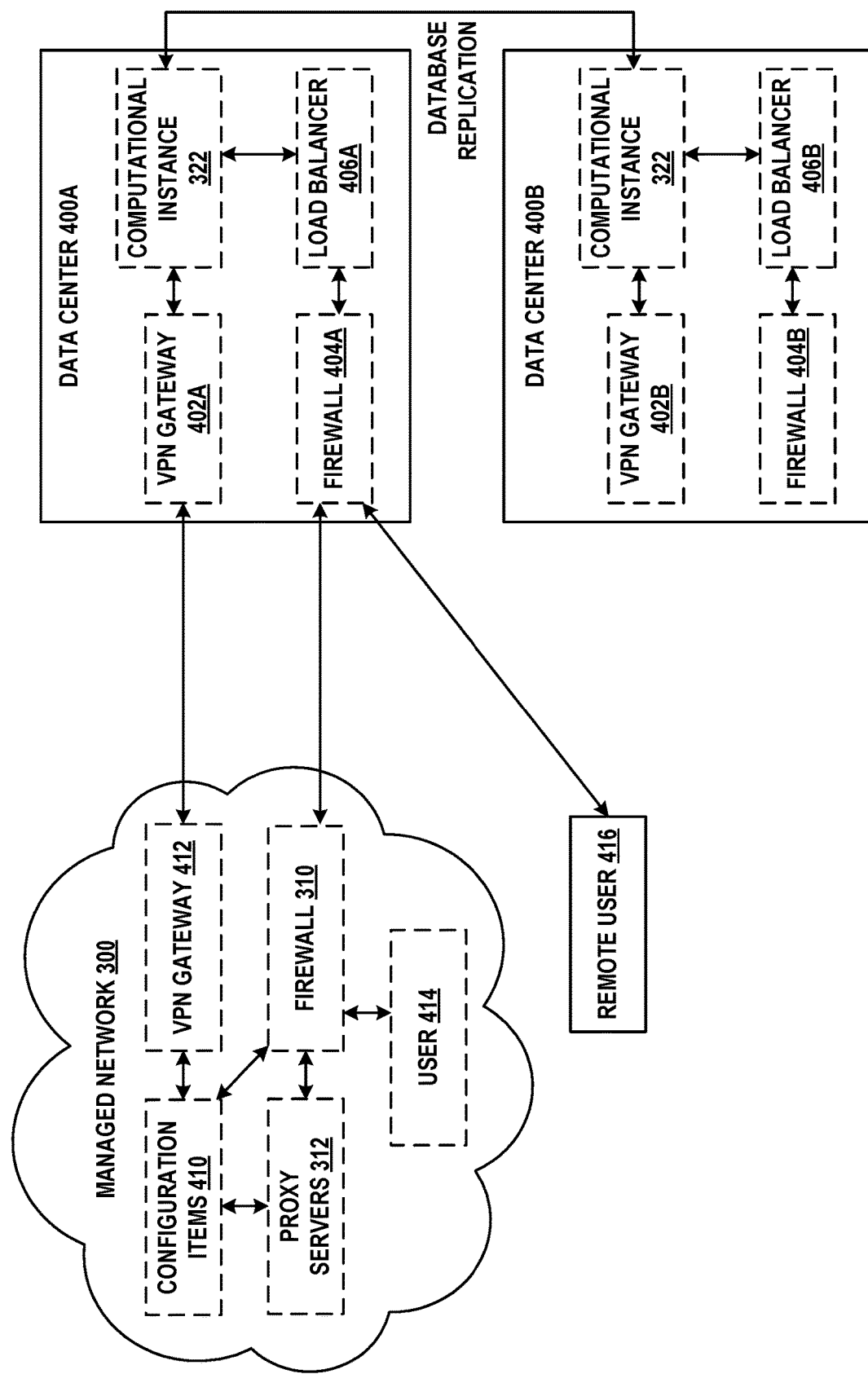
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. EXAMPLE DEVICE, APPLICATION, AND SERVICE DISCOVERY

In order for remote network management platform 320 to administer the devices, applications, and services of managed network 300, remote network management platform 320 may first determine what devices are present in managed network 300, the configurations and operational statuses of these devices, and the applications and services provided by the devices, as well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purposes of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
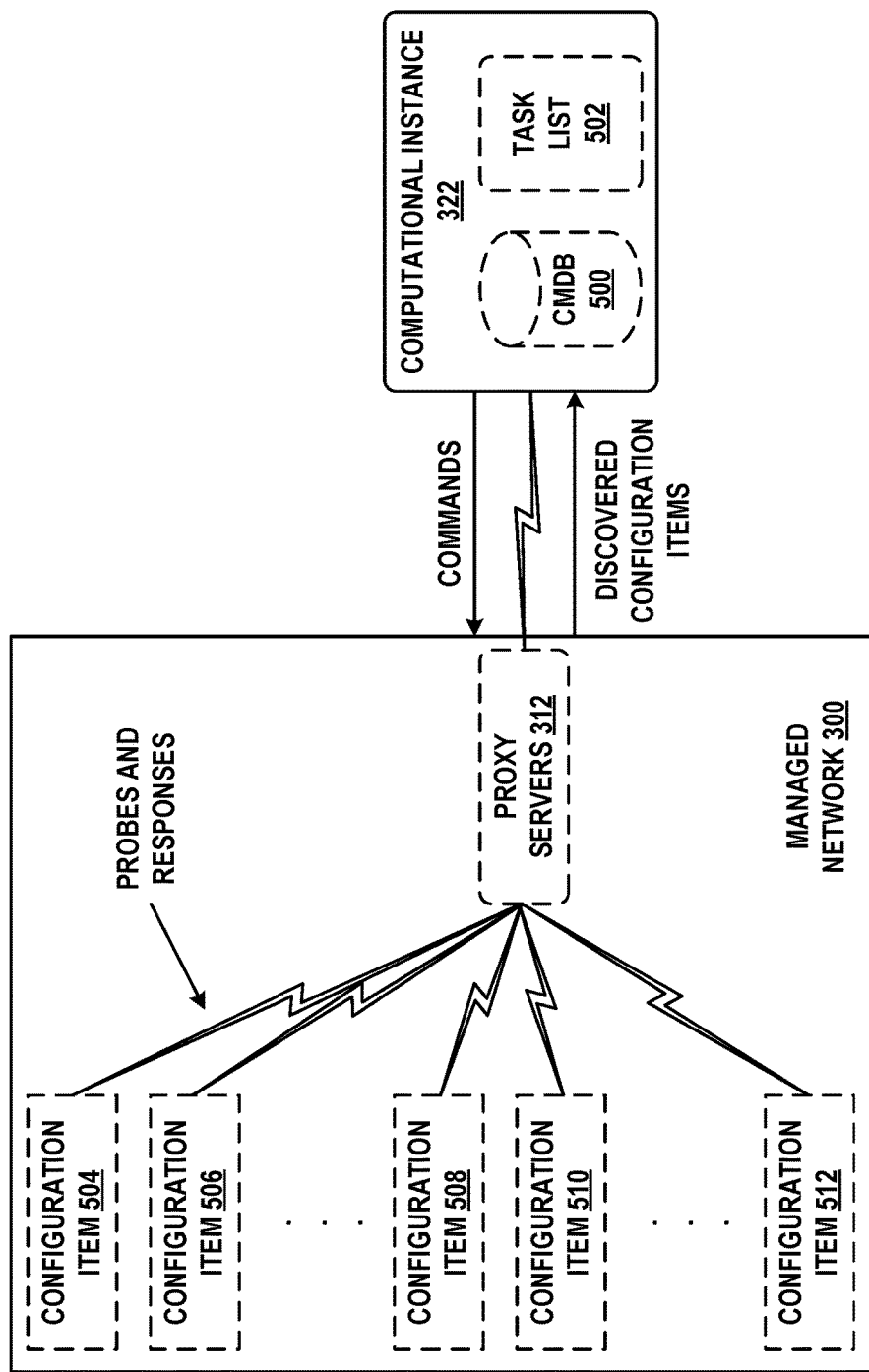
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, public cloud networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address (es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration, and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For example, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
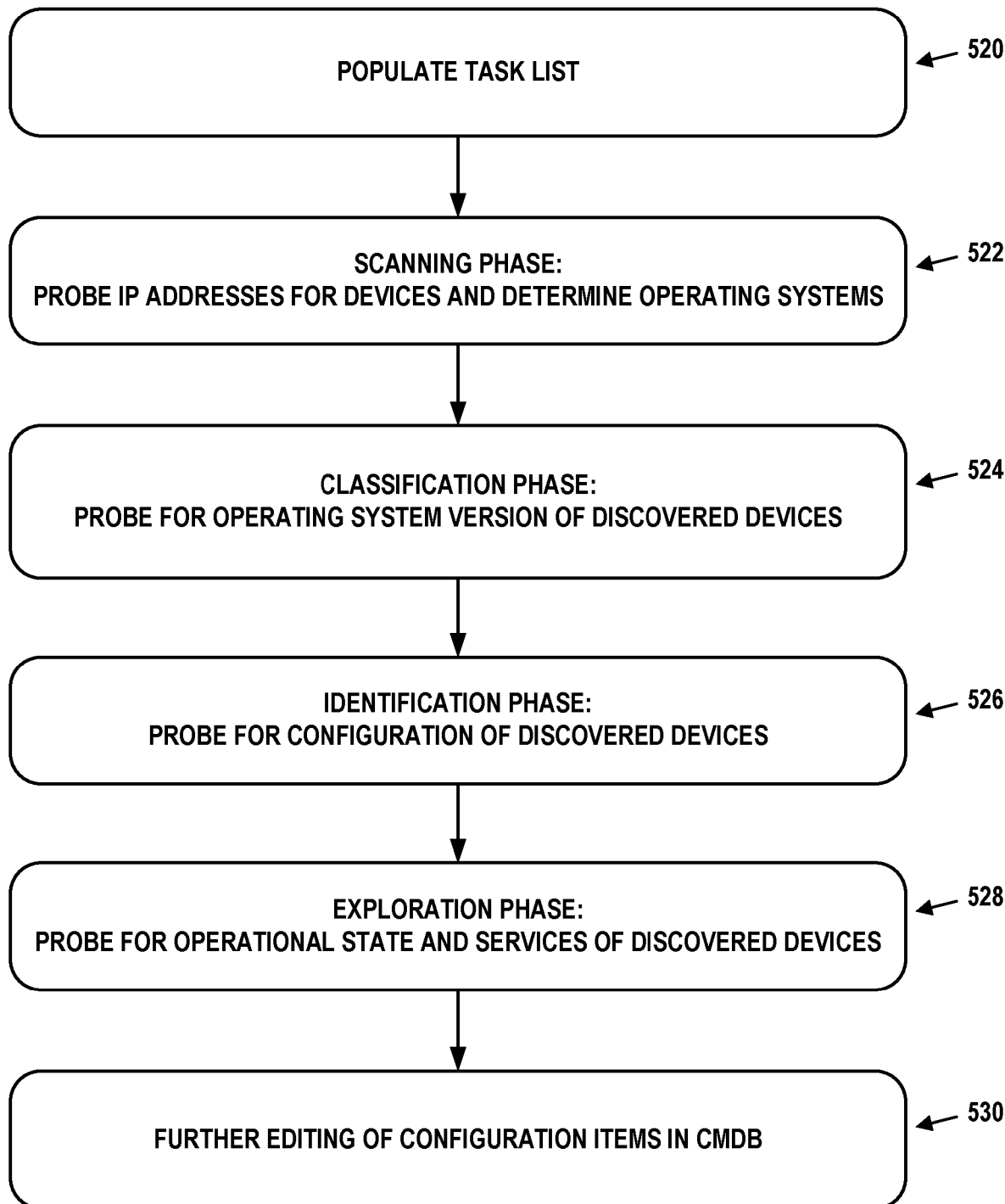
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are examples. Discovery may be a highly configurable procedure that can have more or fewer phases, and the operations of each phase may vary. In some cases, one or more phases may be customized, or may otherwise deviate from the exemplary descriptions above.

In this manner, a remote network management platform may discover and inventory the hardware, software, and services deployed on and provided by the managed network. As noted above, this data may be stored in a CMDB of the associated computational instance as configuration items. For example, individual hardware components (e.g., computing devices, virtual servers, databases, routers, etc.) may be represented as hardware configuration items, while the applications installed and/or executing thereon may be represented as software configuration items.

The relationship between a software configuration item installed or executing on a hardware configuration item may take various forms, such as "is hosted on", "runs on", or "depends on". Thus, a database application installed on a server device may have the relationship "is hosted on" with the server device to indicate that the database application is hosted on the server device. In some embodiments, the server device may have a reciprocal relationship of "used by" with the database application to indicate that the server device is used by the database application. These relationships may be automatically found using the discovery procedures described above, though it is possible to manually set relationships as well.

The relationship between a service and one or more software configuration items may also take various forms. As an example, a web service may include a web server software configuration item and a database application software configuration item, each installed on different hardware configuration items. The web service may have a "depends on" relationship with both of these software configuration items, while the software configuration items have a "used by" reciprocal relationship with the web service. Services might not be able to be fully determined by discovery procedures, and instead may rely on service mapping (e.g., probing configuration files and/or carrying out network traffic analysis to determine service level relationships between configuration items) and possibly some extent of manual configuration.

Regardless of how relationship information is obtained, it can be valuable for the operation of a managed network. Notably, IT personnel can quickly determine where certain software applications are deployed, and what configuration items make up a service. This allows for rapid pinpointing of root causes of service outages or degradation. For example, if two different services are suffering from slow response times, the CMDB can be queried (perhaps among other activities) to determine that the root cause is a database application that is used by both services having high processor utilization. Thus, IT personnel can address the database application rather than waste time considering the health and performance of other configuration items that make up the services.

V. EXAMPLE TROUBLESHOOTING TOOLS

As discussed above, remote network management platform 320 could provide various software applications to enterprise customers. Examples may include device and software discovery applications, service mapping applications, IT operations and service management applications, and machine learning applications. Further, in some embodiments, remote network management platform 320 may allow users to incorporate custom functionality into these software applications. This could involve a user modifying and/or updating a software application's source code (including program code, configuration, and support files) to include new features, functions, and other aspects.

Sometimes, a software application provided by remote network management platform 320 has a "software defect" that causes the application to produce unexpected behavior. Such defects could negatively affect users of the software application. As such, upon discovering a software defect, a user of the software application could submit a support ticket. The support ticket could describe the unexpected behavior of the software application. An agent may be assigned to resolve the issue raised by the ticket. Thus, this agent may have to locate portions of the software application's source code that encompass the unexpected behavior. If the software application includes user-modified portions, the assigned agent may have to parse through the user-modified portions of the source code as well as the "out of the box" portions of the source code.

Since a majority of support tickets involve software defects located in user-modified source code rather than "out of the box" source code, one strategy that the assigned agent could consider is to find and examine only user-modified portions of the source code. However, if the software application's source code is large and contains many user modifications, the process of locating the user-modified portions within the source code may be unduly complicated.

To address these or other issues, remote network management platform 320 may include a troubleshooting tool that can pinpoint user customizations in a software application's source code. The troubleshooting tool could take the form of a background process, an executable application, or the like. The disclosed troubleshooting tool could locate customizations in software applications executable by various computational instances operating within remote network management platform 320. For example, the troubleshooting tool could locate customizations in software applications executable by computational instance 322, 324, and/or 326. For simplicity, examples will now be described using computational instance 322. However, the disclosed principles could apply in other scenarios with other computational instances as well.

Figure 6:
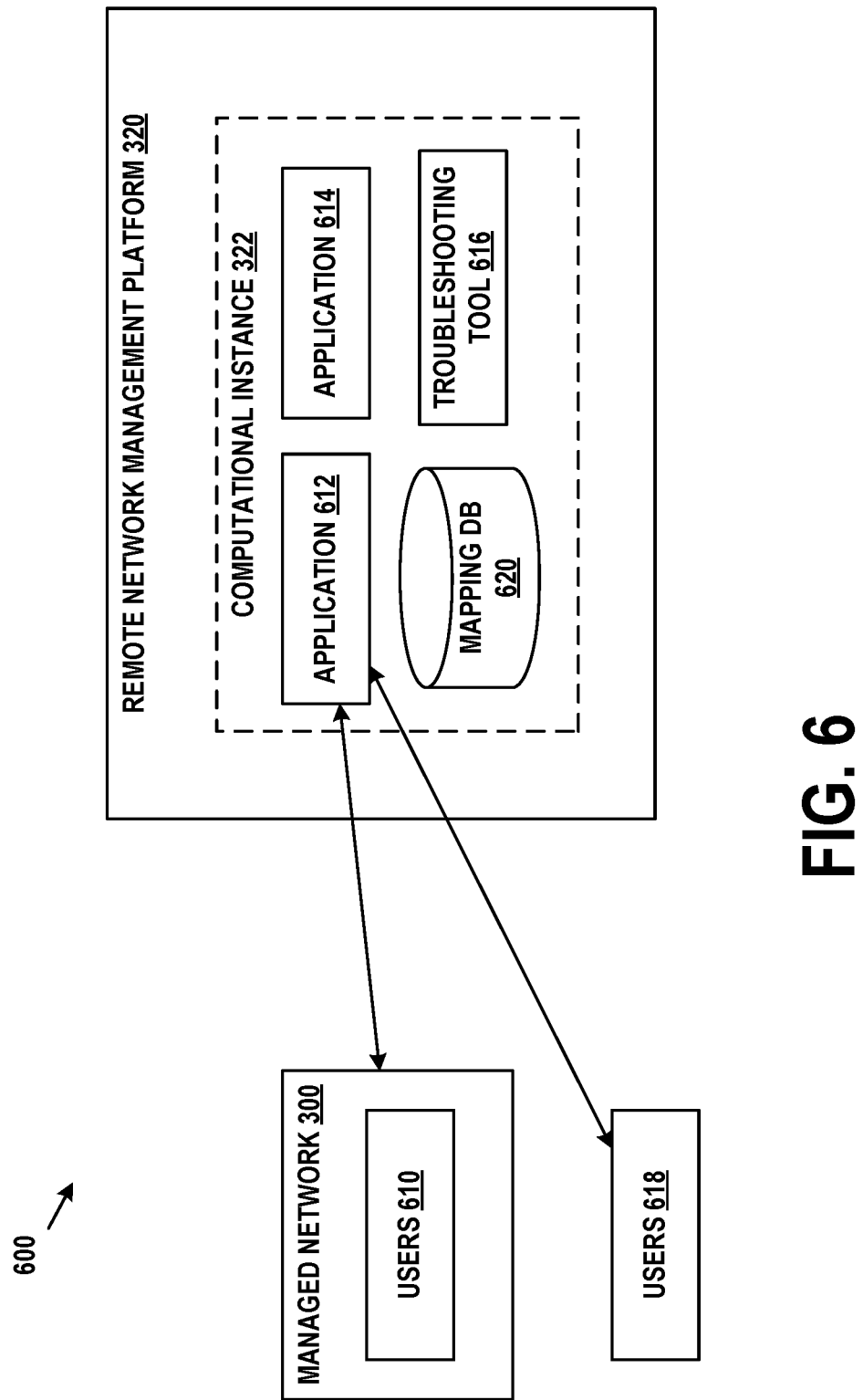
FIG. 6 depicts a network architecture, in accordance with example embodiments.

FIG. 6 depicts network architecture 600, in accordance with example embodiments. Network architecture 600 includes two main components, managed network 300 and remote network management platform 320, which may be communicatively connected by way of a network, such as Internet 350.

Computational instance 322 may be disposed within remote network management platform 320 and may be dedicated to managed network 300. Computational instance 322 may store, in CMDB 500 (not shown), discovered configuration items that represent the environment of managed network 300. Additionally, computational instance 322 may include one or more software applications, such as application 612 and application 614. These software applications could provide computing services to various users, such as users 610 and users 618. The software applications could be developed by remote network management platform 320 or could be developed by a 3rd party. In example embodiments, the software applications in computational instance 322 are comprised of one or more application files.

Figure 7:
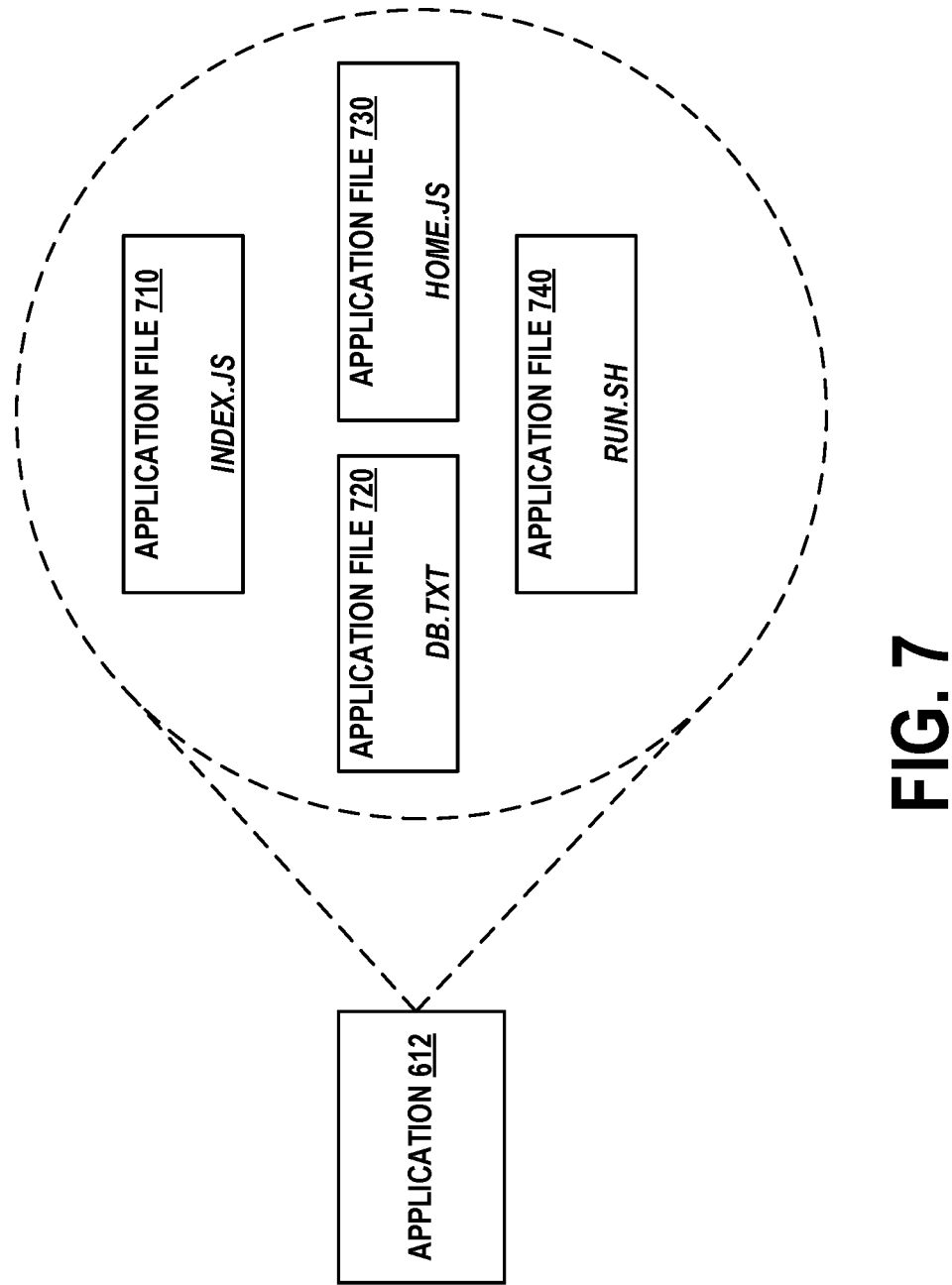
FIG. 7 illustrates application files, in accordance with example embodiments.

FIG. 7 illustrates example application files, in accordance with example embodiments. In particular, FIG. 7 includes a call out of application 612 from FIG. 6. The callout demonstrates how application 612 could contain four application files, application file 710, application file 720, application file 730, and application file 740. Each of these application files provide at least some of the functionality for application 612. For instance, application files 710 and 730 may represent JavaScript functions that provide user interface elements for application 612. And application file 740 may represent a command shell script that starts a build process for application 612. But, application files need not be executable. For example, application file 720 may represent a text file, which could be used to seed a database used by application 612, or for other configuration purposes. In general, these application files may contain any form of source code, object code, machine code, executable instructions, build instructions, configuration instructions, or data that is used to compile and/or execute an application. The application files could be stored in a server device disposed within computational instance 322, a server device disposed within remote network management platform 320, and/or could be stored by way of a remote server device hosted by public cloud networks 340. Notably, application files 710, 720, 730, 740 are presented for the purpose of example and are not intended to be limiting with respect to the embodiments herein. In practice, application 612 could include a fewer number of application files or a greater number of application files, perhaps even hundreds or thousands. Further, other types of application files are also possible and are contemplated in the disclosure herein.

Referring back to FIG. 6, computational instance 322 could also include mapping database 620. As further described below, mapping database 620 may contain data related to application 612, application 614, and perhaps other software applications in computational instance 322. While FIG. 6 illustrates mapping database 620 disposed within computational instance 322, in other embodiments, mapping database 620 could be disposed within remote network management platform 320 and shared amongst multiple computational instances. In such embodiments, mapping database 620 could contain data related to several software applications running in various computational instances.

Managed network 300 may be an enterprise network used by an entity for computing and communication tasks, as well as storage of data. In examples, managed network 300 may utilize one or more of the software applications contained within computational instance 322.

Users 610 and users 618 can represent people or sources (e.g., another enterprise) that use software applications provided by computational instance 322. In example embodiments, users 610 may represent people that work for the entity associated with managed network 300, such as engineers, scientists, managers, accountants, financial analysts, IT staff, and so on, whereas users 618 may correspond to people outside of the entity associated with managed network 300. For simplicity, examples will be described using users 610. However, the disclosed principles could apply in other scenarios with other users as well.

In line with the discussion above, occasionally, a software application provided by computational instance 322 has a software defect that causes the application to produce an unexpected result. Upon discovering a software defect, users 610 could submit a support ticket. To quickly address such a ticket, an agent may be assigned to resolve the problem raised in the ticket, and may use the services of troubleshooting tool 616 in doing so. This agent may be an IT staff member, a software engineer, a customer service engineer, or some other entity.

As noted, troubleshooting tool 616 could be configured to locate application files in the software application's source code that have been written by users 610. Troubleshooting tool 616 could display those located application files in a logical manner, perhaps on a web application or graphical user interface. Accordingly, the agent could use troubleshooting tool 616 to efficiently locate portions in the software application's source code that encompass the unexpected behavior experienced by users 610.

To perform its operations, troubleshooting tool 616 may be granted access to data associated with software applications executable by computational instance 322. For example, troubleshooting tool 616 could access to data related to application 612 and application 614. For simplicity, examples will now be described using application 612 and data related to application 612. However, the disclosed principles could apply in other scenarios with other software applications as well.

Figure 8:
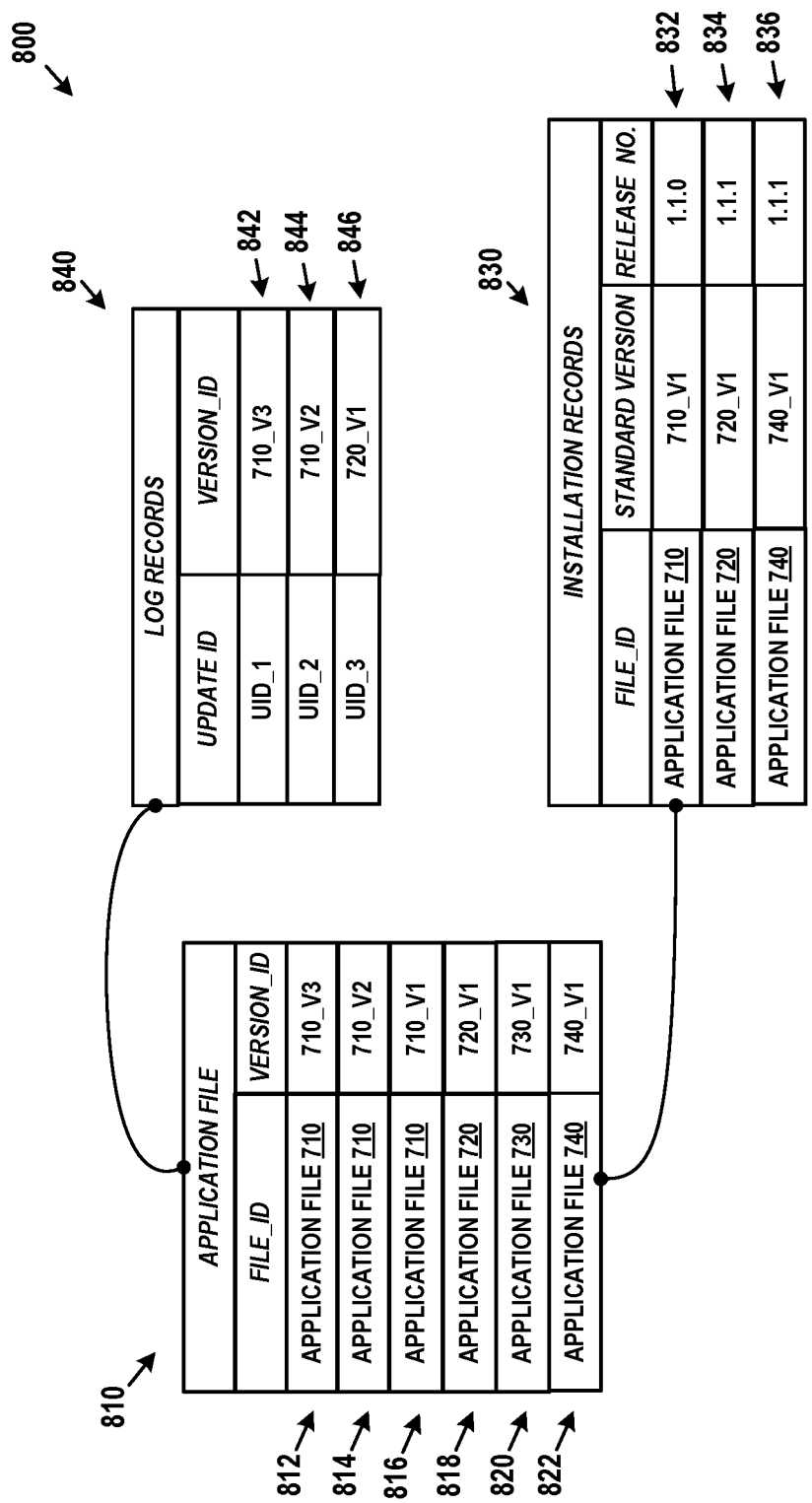
FIG. 8 illustrates data that a troubleshooting tool could use during operations, in accordance with example embodiments.

FIG. 8 illustrates data that troubleshooting tool 616 may use during operation, in accordance with example embodiments. Specifically, FIG. 8 includes three sets of mappings: application file mappings 810, installation record mappings 830, and log record mappings 840. In some embodiments, application file mappings 810, installation record mappings 830, and log record mappings 840 may take the form of database tables on computational instance 322, perhaps stored in mapping database 620 or another database. In other embodiments, the three sets of mappings may take on other forms, such as log files. Further, in other examples, application file mappings 810, installation record mappings 830, and log record mappings 840 can have more, fewer, and/or different types of entries than indicated in FIG. 8.

Application file mappings 810 may include mappings between identifiers of application files and version indicators of those application files. In other words, each entry in application file mappings 810 associates a given application file with a specific version of that application file. For example, entry 812 establishes that application file 710 has a version 710_V3, entry 814 establishes that application file 710 has a version 710_V2, and entry 816 establishes that application file 710 has a version 710_V1. Similarly, entry 818 establishes that application file 720 has a version 720_V1, entry 820 establishes that application file 730 has a version 730_V1, and entry 822 establishes that application file 740 has a version 740_V1. As used herein, a version of an application file is a particular form of the application file that differs in certain respects from other forms of the application file. For example, version 710_V2 of application file 710 may contain some similarities (e.g., functions, variable names, etc.) with version 710_V3 of application file 710, but may also contain some differences from version 710_V3 of application file 710.

A corresponding entry could be added to application file mappings 810 each time a new application file (e.g., an application file that does not have any previous versions) is provided to computational instance 322. For example, users 610 could create a new application file APP_NEW by way of a web-based editor, and then may request that computational instance 322 save the new application file. Upon receiving the save request, computational instance 322 could cause application file mappings 810 to create a new entry that includes a mapping between APP_NEW and a new version of APP_NEW that includes the content created by users 610. Notably, because APP_NEW does not have previous versions, the new version of APP_NEW may be the first (and only) version of APP_NEW referenced by application file mappings 810.

A corresponding entry could also be added to application file mappings 810 every time a modification is made to an existing application file referenced by application file mappings 810. For example, users 610 could make various modifications (e.g., adding and/or subtracting functions, variables, etc.) to version 710_V3 of application file 710 by way of a web-based editor, and then may request that computational instance 322 save their modifications. Upon receiving the save request, computational instance 322 could cause application file mappings 810 to create a new entry that includes a mapping between application file 710 and a new version of application file 710, where the new version contains the contents of version 710_V3 of application file 710 in addition to the modifications made by users 610. In some cases, the entry could be a representation of the difference itself, such as a delta between the two files.

While not shown in FIG. 8, application file mappings 810 could include additional fields, such as timestamp fields indicating when a particular version of an application file was added, and/or text fields identifying the entity that added a particular version of an application file, among other possibilities.

Installation record mappings 830 may include mappings between identifiers of application files and records indicating a version of those application files that is part of a standardized release of application 612. For example, entry 832 establishes that version 710_V1 of application file 710 is part of a standardized release of application 612. Similarly, entry 834 establishes that version 720_V1 of application file 720 is part of the same standardized release of application 612, and entry 836 establishes that version 740_V1 of application file 740 is part of the same standardized release of application 612. Installation record mappings 830 do not contain entries for application file 730. This means that application file 730 does not include a version that is part of a standardized release of application 612.

As used herein, a standardized release of a software application refers to a version of the software application that is written by the entity that developed the software application. For instance, if remote network management platform 320 developed application 612, then any version of application 612 that is written by remote network management platform 320 may be considered a standardized release. A software application could have several standardized releases, each containing one or more application file versions. For example, as shown in installation record mappings 830, standardized release 1.1.0 of application 612 could include version 710_V1 of application file 710 and standardized release 1.1.1 of application 612 could include version 720_V1 of application file 720 and version 740_V1 of application file 740. A version of an application file that is part of a standardized release may be referred herein to as a standardized release version of the application file. In some cases, an application file may have more than one standardized release version. For example, standardized release 1.1.0 of application 612 could include version 710_V1 of application file 710 and standardized release 1.1.1 of application 612 could include version 710_V2 of application file 710. In such an example, installation record mappings 830 may have multiple entries for application file 710.

A corresponding entry could be added to installation record mappings 830 each time a standardized release version of an application file is installed onto computational instance 322. For example, remote network management platform 320 could install standardized release 1.1.0 of application 612 onto computational instance 322. Standardized release 1.1.0 of application 612 could include version 710_V1 of application file 710. Thus, upon receiving the installation, computational instance 322 could cause installation record mappings 830 to create a new entry that includes a mapping between application file 710 and version 710_V1 of application file 710.

While not shown in FIG. 8, installation record mappings 830 could also include additional fields, such as timestamp fields indicating when a standardized release version an application file was installed, and/or text fields identifying the entity that installed a standardized release version an application file, among other possibilities.

Log record mappings 840 may include mappings between version indicators of application files and records indicating that the corresponding application file versions were written after a standardized release of application 612 was installed on computational instance 322. For example, entry 842 establishes that version 710_V3 of application file 710 was written after a standardized release of application 612 was installed on computational instance 322. Similarly, entry 844 establishes that version 710_V2 of application file 710 was written after a standardized release of application 612 was installed on computational instance 322, and entry 846 establishes that version 720_V1 of application file 720 was written after a standardized release of application 612 was installed on computational instance 322. Log record mappings 840 do not contain entries for versions of application files 730 and 740. This means that application file 730 does not include a version that was written after a standardized release of application 612 was installed on computational instance 322 and that application file 740 does not include a version that was written after a standardized release of application 612 was installed on computational instance 322.

A corresponding entry could be added to log record mappings 840 every time computational instance 322 receives a version of an application file that was written after a standardized release of application 612 was installed on computational instance 322. For instance, upon receiving a version of an application file (perhaps via the web-based editor described above), computational instance 322 could assign to the application file version a unique identifier and then evaluate whether the application file version was written after a standardized release of application 612 was installed on computational instance 322. If computational instance 322 determines that the application file version was written after a standardized release of application 612 was installed on computational instance 322, then computational instance 322 cause log record mappings 840 to create a new entry that includes a mapping between the unique identifier and the application file version.

Computational instance 322 could utilize various approaches when determining whether a given application file version was written after a standardized release of application 612 was installed on computational instance 322. In one example, if application 612 has one standardized release, computational instance 322 could determine a timestamp indicating when that one standardized release was installed onto computational instance 322. Accordingly, all application file versions written after that timestamp could be considered as being written after a standardized release of application 612 was installed on computational instance 322.

On the other hand, if application 612 has a plurality of standardized releases, computational instance 322 could determine timestamps indicating when each of the plurality of standardized releases was installed onto computational instance 322. Then, when evaluating whether an application file version was written after a standardized release of application 612 was installed on computational instance 322, computational instance 322 could base its evaluation on the earliest timestamp for the plurality of standardized releases, the most recent timestamp for the plurality of standardized releases, or possibly another timestamp.

In some embodiments, computational instance 322 could utilize different timestamps when evaluating different application files. For instance, if application file 710 includes a version that is part of standardized release 1.1.0 of application 612 and application file 720 includes a version that is part of standardized release 1.1.1 of application 612, then computational instance 322 could use the timestamp for standardized release 1.1.0 when evaluating whether a version of application file 710 was written after a standardized release and could use the timestamp for standardized release 1.1.1 when evaluating whether a version of application file 712 was written after a standardized release.

Further, in scenarios where an application file has multiple standardized release versions, computational instance 322 could base its evaluation on the earliest timestamp from the multiple standardized release versions, the most recent timestamp from the multiple standardized release versions, or possibly another timestamp. For example, if application file 710 includes a version that is part of standardized release 1.1.0 of application 612 and also includes a version that is part of standardized release 1.1.1 of application 612, then computational instance 322 could use the timestamp for standardized release 1.1.0 or the timestamp for standardized release 1.1.1 when evaluating whether a version of application file 710 was written after a standardized release of application 612 was installed onto computational instance 322.

While not shown in FIG. 8, log record mappings 840 could also include additional fields, such as timestamps fields indicating when a version an application file was provided to computational instance 322, and/or and text fields indicating an entity that provided the new version of the application file, among other possibilities.

Application file mappings 810, installation record mappings 830, and log record mappings 840 can provide troubleshooting tool 616 with information to establish (i) a set of application files that provide functionality for application 612 as well as various versions of those application files, (ii) which application files of application 612 have versions that were written after a standardized release of application 612 was installed on computational instance 322, and (iii) which application files of application 612 have versions that were part of a standardized release of application 612.

Figure 9:
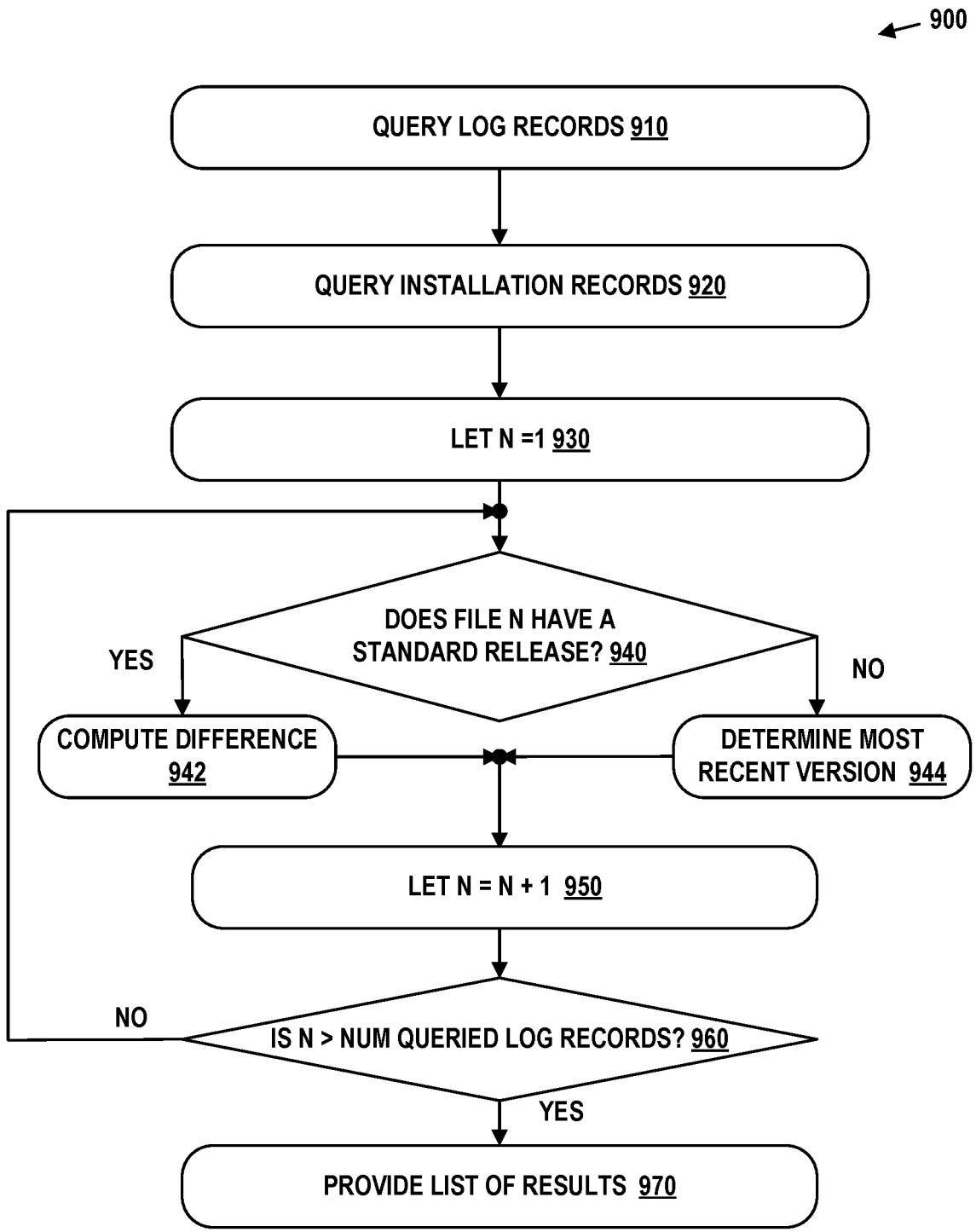
FIG. 9 is a flow chart illustrating example operations of a troubleshooting tool, in accordance with example embodiments.

Example operations of troubleshooting tool 616 are depicted as flow chart 900 in FIG. 9. At block 910, troubleshooting tool 616 could query log record mappings 840 to determine a first subset of application files that have at least one version written after a standardized release of application 612 was installed on computational instance 322. Then at block 920, troubleshooting tool 616 could query installation record mappings 830 to determine a second subset of application files that have at least one version that was part of a standardized release of application 612. In some embodiments, the first subset of application files includes a greater quantity of application files than the second subset of application files. In other embodiments, the first subset of application files includes a fewer quantity of application files than the second subset of application files. Further, in some implementations, the first subset of application files shares at least one application file with the second subset of application files.

Using the results from block 910 and 920, troubleshooting tool 616 could determine whether a given application file from the first subset of application files has a version that was part of a standardized release of application 612. To do this, troubleshooting tool 616 could iterate through the first subset of application files and determine whether a given application file in the first subset of application files is also contained in the second subset of application files. For example, at block 930, troubleshooting tool 616 could let the variable N=1, and then at block 940 troubleshooting tool 616 could determine whether application file N from the first subset of application files is also contained in the second subset of application files. If troubleshooting tool 616 determines that application file N has a version that was part of a standardized release of application 612 (e.g., is also contained in the second subset of application files), flow chart 900 may continue to block 942. Otherwise, flow chart 900 may continue to block 944. In other embodiments, troubleshooting tool 616 could perform a set intersection operation between the first subset of application files and the second subset of application files to determine whether a given application file from the first subset of application files has a version that was part of a standardized release of application 612. Other methods are also possible.

At block 942, troubleshooting tool 616 may compute a textual difference between a most recent version of application file N and a standardized release version of application file N. In example embodiments, the most recent version of application file N could be a version of application file N that has a most recent timestamp. Further, the standardized release version of application file N could be a version of application file N that was most recently (as determined by timestamp) installed by remote network management platform 320 onto computational instance 322. At block 944, troubleshooting tool 616 may determine a most recent version of application file N.

At block 950, troubleshooting tool 616 could let N=N+1. Then at block 960, troubleshooting tool 616 could determine whether N is greater than the number of application files in the first subset of application files. If troubleshooting tool 616 determines that N is greater than the number of application files in the first subset of application files, then flow chart 900 may continue to block 970. Otherwise, flow chart 900 may loop back to block 940.

A block 970, troubleshooting tool 616 may provide a list of results. The list could include results from the computations at block 942 as well as results from the computations at block 944.

Note that the blocks represented in FIG. 9 are used for the purpose of example and are not intended to be limiting with respect to the embodiments herein. The operations of troubleshooting tool 616 may be highly configurable and may include more blocks, fewer blocks, or different blocks than those depicted in flow chart 900. In some cases, one or more blocks may be customized, reordered, or may otherwise deviate from the exemplary description above. For example, in some embodiments, computing the textual difference at block 942 and determining the most recent version of application file N at block 944 may occur after providing the list of results at block 970.

After using the process illustrated in flow chart 900, troubleshooting tool 616 could display the results from block 970 is a logically manner so as to allow the assigned agent to view a list of all application files associated with application 612. For example, troubleshooting tool 616 could display the results by way of a web page or series of web pages hosted by computational instance 322 to the assigned agent upon request. Notably, the following examples of web pages are merely for purposes of illustration and not intended to be limiting. Other web pages including alternative arrangements of information may exist.

FIG. 10A illustrates web page 1000, in accordance with example embodiments. Web page 1000 includes a visual listing 1002 of application files that provide at least some functionality to application 612. As shown, each record in visual listing 1002 includes a corresponding entry for created column 1004, last modified column 1006, updated by column 1008, class column 1010, and display name column 1012.

Created column 1004 provides a timestamp indicating when a given application file from visual listing 1002 was created. In line with the discussion above, application files may be created by users 610 or by an entity that developed application 612. If users 610 create an application file, then a corresponding entry in created column 1004 would indicate the date that users 610 provided the application file to computational instance 322. On the other hand, if the entity that developed application 612 creates the application file, then a corresponding entry in created column 1004 would indicate the date that the entity installed the application file onto computational instance 322. In FIG. 10A, application file 1014 is shown to be created on "2019-11-15", application file 1016 is also shown to be created on "2019-11-15", and application file 1018 is shown to be created on "2020-1-20".

Last modified column 1006 provides a timestamp indicating when a given application file from visual listing 1002 was last modified. In line with the discussion above, application files may be modified by users 610. Thus, if users 610 modify an application file, a corresponding entry in last modified column 1006 would indicate the date that users 610 provided the modified application file to computational instance 322. On the other hand, if an application file has not been modified by users 610, the corresponding entry in last modified column 1006 for that application file may mirror the entry in created column 1004, because the last time the application file was modified would be the same time as when the application file was created. In FIG. 10A, application file 1014 is shown to be last modified on 2019-11-15, application file 1016 is shown to be last modified on 2019-12-30, and application file 1018 is shown to be last modified on 2020-1-20.

Updated by column 1008 provides a username indicating an entity that last updated (e.g., either created or modified) a given application file from visual listing 1002. For example, application file 1014 is shown to be last updated by the entity "admin", application file 1016 is shown to be last updated by the entity "user 222", and application file 1018 is shown to be last updated by the entity "user 123".

Class column 1010 provides a technical group for a given application file from visual listing 1002. For example, application file 1014 is shown to be an "access control" file, application file 1016 is shown to be a "dictionary entry" file, and application file 1018 is also shown to be an "access control" file.

Display name column 1012 provides a display name for a given application file in visual listing 1002. For example, application file 1014 has a display name "access.js", application file 1016 has a display name "passwords.sql", and application file 1018 has a display name "security.js".

In some embodiments, web page 1000 may provide a series of graphical tabs that can be clicked or otherwise selected by a user. In such embodiments, selecting one of these graphical tabs may cause web page 1000 to rearrange its information and/or filter the application files in visual listing 1002. For example, clicking one of these tabs may cause web page 1000 to filter the application files in visual listing 1002 such that only "new" application files (e.g., application files that were created by users 610) are listed. As another example, clicking one of these tabs may cause web page 1000 to filter the application files in visual listing 1002 such that only "modified" application files (e.g., application files that were written after a standardized release of application 612 was installed) are listed. Other types of tabs with other functionality may also exist.

In some cases, a user may view additional information related to each application file from visual listing 1002. For example, if the user clicks on or otherwise selects application file 1014, the user may be directed to a web page that enables the user to view application file 1014 in its original state and in a customized state, with differences between the two states highlighted to pinpoint changes that have been made to application file 1014.

Figure 10B:
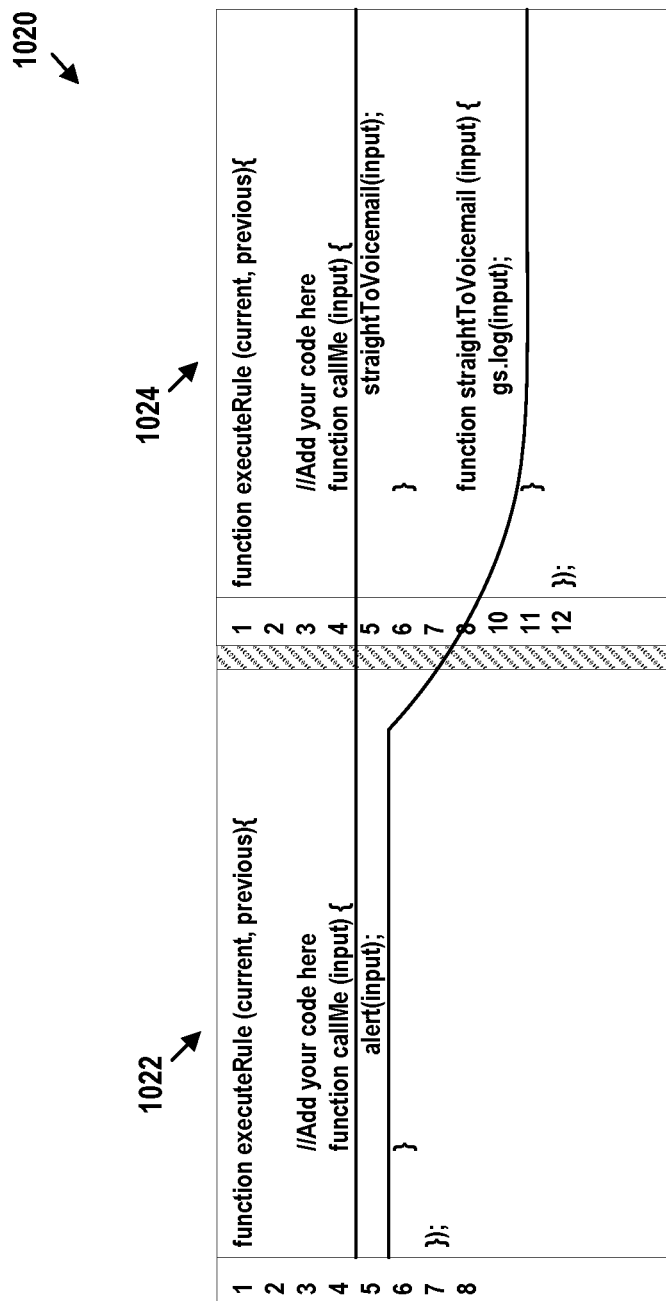

An example of such a web page is illustrated in FIG. 10B. Web page 1020 includes original state view 1022 of an application file on the left side and customized state view 1024 of an application file on the right side. The differences between original state view 1022 and customized state view 1024 are highlighted. In example embodiments, original state view 1022 may correspond to a standardized release version of the application file that was most recently (as determined by timestamp) installed by remote network management platform 320. Further, the customized state view 1024 may correspond to a most recent version (as determined by timestamp) of the application file. In some embodiments, if the application file does not have a version that was part of a standardized release of application 612, web page 1020 may just display the customized state view 1024. In other embodiments, if the application file does not have a version that was written after a standardized release of the software application was installed on computational instance 322, web page 1020 may just display original state view 1022.

Figure 11:
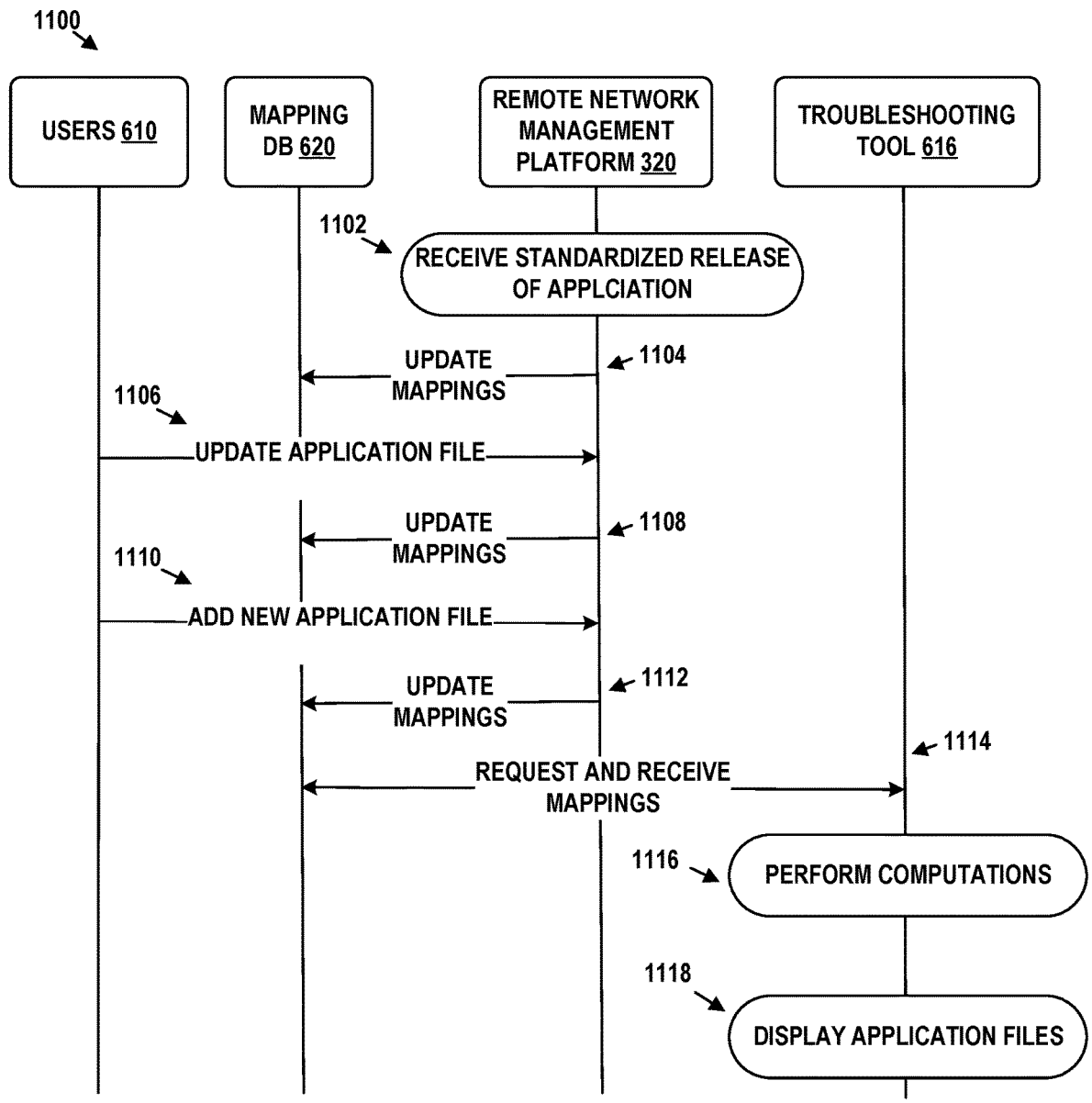
FIG. 11 depicts a message flow, in accordance with example embodiments.

FIG. 11 depicts message flow 1100, in accordance with example embodiments. In particular, message flow 1100 illustrates how troubleshooting tool 616 can use mappings in mapping database 620 to display various application files related to application 612. By way of example, message flow 1100 may involve users 610, mapping database 620, remote network management platform 320, and troubleshooting tool 616. However, additional components, steps, or blocks, may be added to message flow 1100 without departing from the embodiments herein. Furthermore, troubleshooting tool 616 may be part of or hosted on remote network management platform 320.

At step 1102, a standardized release of application 612 is installed onto remote network management platform 320, perhaps onto computational instance 322. In line with the discussion above, the standardized release could include one or more application files that are written by the entity that developed application 612. Example entities could include remote network management platform 320 or a 3rd party application developer, among other possibilities. In some embodiments, step 1102 could be initiated by the entity that developed application 612. In others embodiments, step 1102 could be initiated manually; that is, an administrator or other authorized personnel associated with remote network management platform 320 (perhaps from managed network 300) could request a standardized release installation of application 612. At step 1104, remote network management platform 320 could update one or more mappings in mapping database 620. Namely, remote network management platform 320 could update the entries in application record mappings 810 and installation record mappings 830 to include the one or more application file versions that were installed at step 1102.

At step 1106, users 610 could update one or more of the application files of application 612. This could be accomplished by way of a web page or series of web pages hosted by remote network management platform 320 (e.g., via computational instance 322) and provided to users 610 upon request. Using these web pages, users 610 could make updates to the application files and then could transmit those updates back to remote network management platform 320. At step 1108, remote network management platform 320 could update one or more mappings in mapping database 620. Namely, remote network management platform 320 could update the entries in application record mappings 810 and log record mappings 840 to include the application file updates received at step 1106.

At step 1110, users 610 could create one or more new application files to provide new functionality to application 612. Similar to step 1106, this could be accomplished by way of a web page or series of web pages hosted by remote network management platform 320 and provided to users 610 upon request. Using the web pages, users 610 could create new application files and then could transmit those new application files to remote network management platform 320. At step 1112, remote network management platform 320 could update one or more mappings in mapping database 620. Namely, remote network management platform 320 could update the entries in application record mappings 810 and log record mappings 840 to include the new application files received at step 1110.

At step 1114, troubleshooting tool 616 may request and receive data from mapping database 620, in particular entries in application record mappings 810, installation record mappings 830, and log record mappings 840. This may be accomplished in various ways. For instance troubleshooting tool 616 could submit a SQL query to mapping database 620. Alternatively and/or additionally, troubleshooting tool 616 could submit a request (e.g. a representative state transfer (REST) request) to an application programming interface (API) endpoint associated with mapping database 620. Other examples are also possible. At step 1116, troubleshooting tool 616 could utilize the data received at step 1114 to determine a first subset of application files that have at least one version written after a standardized release of application 612 was installed, a second subset of application files that have at least one version that was part of a standardized release of application 612, and whether a given application file in the first subset of application files is also contained in the second subset of application files. This could be accomplished, for example, via the process outlined in FIG. 9.

In some embodiments, troubleshooting tool 616 may repeat the operations of steps of 1114 and 1116. For example, troubleshooting tool 616 may repeat the operations of steps of 1114 and 1116 at regularly occurring time intervals, such as every minute, every hour, and so on. As another example, troubleshooting tool 616 may repeat the operations of steps of 1114 and 1116 in response to an event occurring at application 612, such a standardized release being installed for application 612, an application file update being provided by users 610 to application 612, or on demand among other possibilities.

At step 1118, troubleshooting tool 616 may display, on a GUI, the information determined at step 1116. This could be accomplished, for example, via the web pages outlined in FIGS. 10A-10B.

VI. EXAMPLE OPERATIONS

FIG. 12 is a flow chart illustrating an example embodiment. The process illustrated by FIG. 12 may be carried out by a computing device, such as computing device 100, and/or a cluster of computing devices, such as server cluster 200. However, the process can be carried out by other types of devices or device subsystems. For example, the process could be carried out by a computational instance of a remote network management platform or a portable computer, such as a laptop or a tablet device.

The embodiments of FIG. 12 may be simplified by the removal of any one or more of the features shown therein. Further, these embodiments may be combined with features, aspects, and/or implementations of any of the previous figures or otherwise described herein.

Block 1200 involves determining, based on a second set of mappings, that an application file referenced by a third set of mappings has a version that was in a standardized release of a software application. The software application is executable by a computational instance. The computational instance includes persistent storage. The persistent storage contains a first set of mappings between identifiers of application files related to the software application and version indicators of the application files. The persistent storage also contains the second set of mappings. The second set of mappings include mappings between the identifiers of the application files and a first subset of the version indicators, where the standardized release of the software application includes versions of the application files in accordance with the first subset of the version indicators. The persistent storage further contains the third set of mappings. The third set of mappings include mappings between a second subset of the version indicators and records indicating that the corresponding application file versions have been written to the persistent storage after the standardized release of the software application was installed on the computational instance.

Block 1210 involves responsive to determining that the application file does include a version that was in the standardized release of the software application, providing, based on the first set of mappings, a difference between a most recent version of the application file and the version of the application file that was part of the standardized release.

In some embodiments, providing the difference includes generating, for display on a graphical user interface, a representation of the most recent version of the application file and a representation of the version of the application file that was part of the standardized release, and transmitting the representations as generated to a client device. Further, in such embodiments, the difference between the most recent version of the application file and the version of the application file that was part of the standardized release is marked to be highlighted on the graphical user interface.

Some embodiments may involve determining, based on the second set of mappings, that a second application file of the application files referenced by the third set of mappings does not include any version that was in the standardized release of the software application; and responsive to determining that the second application file does not include any version that was in the standardized release of the software application, providing, based on the first set of mappings, the most recent version of the second application file.

In some embodiments, providing the most recent version of the second application file includes generating, for display on a graphical user interface, a representation of the most recent version of the second application file and transmitting the representation as generated to a client device.

Some embodiments may involve receiving, from the remote network management platform and for installation on the computational instance, the standardized release of the software application; determining versions of the application files that are part of the standardized release; updating the first set of mappings to include mappings between identifiers of application files that are part of the standardized release and version indicators for the application files that are part of the standardized release; and updating the second set of mappings to include mappings between the identifiers of application files that are part of the standardized release and the version indicators for the application files that are part of the standardized release.

Some embodiments involve receiving, by way of a web-based editor, a modification to a particular application file referenced in the first set of mappings, where the modification creates a new version of the particular application file. Such embodiments may further involve updating the first set of mappings to include a new mapping between an identifier for the particular application file and a version indicator for the new version of the particular application file; and updating the third set of mappings to include a new mapping between the version indicator for the new version of the particular application file and a record indicating that the new version of the particular application file has been written to the persistent storage after the standardized release of the software application was installed on the computational instance.

In some embodiments, a plurality of standardized releases of the software application were installed onto the computational instance, each respective standardized release including a timestamp indicating when the respective standardized release was installed onto the computational instance. In such embodiments, determining that the application file does include a version that was in the standardized release of the software application may involve determining that the application file includes a version that was written after a most recent timestamp amongst the plurality of standardized releases.

In some embodiments, a system may include means for determining, based on a second set of mappings, that an application file referenced by a third set of mappings has a version that was in a standardized release of a software application. The software application is executable by a computational instance. The computational instance includes persistent storage. The persistent storage contains a first set of mappings between identifiers of application files related to the software application and version indicators of the application files. The persistent storage also contains the second set of mappings. The second set of mappings include mappings between the identifiers of the application files and a first subset of the version indicators, where the standardized release of the software application includes versions of the application files in accordance with the first subset of the version indicators. The persistent storage further contains the third set of mappings. The third set of mappings include mappings between a second subset of the version indicators and records indicating that the corresponding application file versions have been written to the persistent storage after the standardized release of the software application was installed on the computational instance. The system may also include means for, responsive to determining that the application file does include a version that was in the standardized release of the software application, providing, based on the first set of mappings, a difference between a most recent version of the application file and the version of the application file that was part of the standardized release.

VII. CLOSING

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, or compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A computer-implemented method comprising:
    obtaining, for installation into persistent storage, a software release;
    updating a set of mappings to include mappings between identifiers of application files that are part of the software release and version indicators for the application files that are part of the software release;
    determining, based on the set of mappings, that a version of an application file has been written to persistent storage after the software release was installed, wherein the application file is one of a plurality of the application files that make up the software release, wherein the version of the application file was written in response to a user customization of the application file;
    determining a difference between the version of the application file and a previous version of the application file that was included in the software release; and
    transmitting, to a client device, a representation of the difference.

2. The computer-implemented method of claim 1, wherein transmitting the representation of the difference comprises:
    generating, for display on a graphical user interface, a representation of the version of the application file and a representation of the previous version of the application file; and
    transmitting the representations as generated.

3. The computer-implemented method of claim 2, wherein the difference between the version of the application file and the previous version of the application file is highlighted on the graphical user interface.

4. The computer-implemented method of claim 1, wherein determining that the version of the application file has been written to persistent storage after the software release was installed comprises finding an entry in a log, wherein the entry indicates that the previous version of the application file was modified into the version of the application file after the software release.

5. The computer-implemented method of claim 1, wherein determining that the version of the application file has been written to persistent storage after the software release was installed comprises finding an entry in a log, wherein the entry indicates that a timestamp of the version of the application file written to persistent storage is greater than a timestamp of the software release.

6. The computer-implemented method of claim 1, wherein determining that the version of the application file has been written to persistent storage after the software release was installed comprises finding an entry in a log, wherein the entry references the version of the application file, and wherein creation of the entry comprises:

receiving the version of the application file;
determining that the version of the application file is different from the previous version of the application file; and
in response to determining that the version of the application file is different from the previous version of the application file, writing, in the entry, a reference to the version of the application file.

7. The computer-implemented method of claim 1, wherein determining that the version of the application file has been written to persistent storage after the software release was installed comprises finding a record in installation mappings indicating that the previous version of the application file is standard in the software release.

8. The computer-implemented method of claim 1, wherein the set of mappings includes an indication of an entity that added the version of the application file.

9. An article of manufacture including a non-transitory computer-readable medium, having stored thereon program instructions that, upon execution by a one or more processors a computing system, cause the computing system to perform operations comprising:
obtaining, for installation into persistent storage, a software release;
updating a set of mappings to include mappings between identifiers of application files that are part of the software release and version indicators for the application files that are part of the software release;
determining, based on the set of mappings, that a version of an application file has been written to persistent storage after the software release was installed, wherein the application file is one of a plurality of the application files that make up the software release, wherein the version of the application file was written in response to a user customization of the application file;
determining a difference between the version of the application file and a previous version of the application file that was included in the software release; and
transmitting, to a client device, a representation of the difference.

10. The article of manufacture of claim 9, wherein transmitting the representation of the difference comprises:
generating, for display on a graphical user interface, a representation of the version of the application file and a representation of the previous version of the application file; and
transmitting the representations as generated.

11. The article of manufacture of claim 10, wherein the difference between the version of the application file and the previous version of the application file is highlighted on the graphical user interface.

12. The article of manufacture of claim 9, wherein determining that the version of the application file has been written to persistent storage after the software release was installed comprises finding an entry in a log, wherein the entry indicates that the previous version of the application file was modified into the version of the application file after the software release.

13. The article of manufacture of claim 9, wherein determining that the version of the application file has been written to persistent storage after the software release was installed comprises finding an entry in a log, wherein the entry indicates that a timestamp of the version of the application file written to persistent storage is greater than a timestamp of the software release.

14. The article of manufacture of claim 9, wherein determining that the version of the application file has been written to persistent storage after the software release was installed comprises finding an entry in a log, wherein the entry references the version of the application file, and wherein creation of the entry comprises:
receiving the version of the application file;
determining that the version of the application file is different from the previous version of the application file; and
in response to determining that the version of the application file is different from the previous version of the application file, writing, in the entry, a reference to the version of the application file.

15. The article of manufacture of claim 9, wherein determining that the version of the application file has been written to persistent storage after the software release was installed comprises finding a record in installation mappings indicating that the previous version of the application file is standard in the software release.

16. The article of manufacture of claim 9, wherein the set of mappings includes an indication of an entity that added the version of the application file.

17. A computing system comprising:
memory;
one or more processors; and
program instructions stored in the memory that, upon execution by the one or more processors, cause the computing system to perform operations comprising:
obtaining, for installation into persistent storage, a software release;
updating a set of mappings to include mappings between identifiers of application files that are part of the software release and version indicators for the application files that are part of the software release;
determining, based on the set of mappings, that a version of an application file has been written to persistent storage after the software release was installed, wherein the application file is one of a plurality of the application files that make up the software release, wherein the version of the application file was written in response to a user customization of the application file;
determining a difference between the version of the application file and a previous version of the application file that was included in the software release; and
transmitting, to a client device, a representation of the difference.

18. The computing system of claim 17, wherein determining that the version of the application file has been written to memory after the software release was installed comprises finding an entry in a log, wherein the entry references the version of the application file, and wherein creation of the entry comprises:
receiving the version of the application file;
determining that the version of the application file is different from the previous version of the application file; and
in response to determining that the version of the application file is different from the previous version of the application file, writing, in the entry, a reference to the version of the application file.

* * * * *